United States Patent
Zhu et al.

(10) Patent No.: US 9,928,631 B2
(45) Date of Patent: Mar. 27, 2018

(54) METHOD FOR GENERATING SCREENSHOT IMAGE ON TELEVISION TERMINAL AND ASSOCIATED TELEVISION

(71) Applicants: HISENSE ELECTRIC CO., LTD., Qingdao (CN); HISENSE USA CORPORATION; HISENSE INTERNATIONAL CO., LTD., Qingdao (CN)

(72) Inventors: Shuo Zhu, Qingdao (CN); Chenglong Liu, Qingdao (CN)

(73) Assignees: HISENSE ELECTRIC CO., LTD., Shandong (CN); HISENSE USA CORPORATION, Georgia (CN); HISENSE INTERNATIONAL CO., LTD., Shandong (CN)

( * ) Notice: Subject to any disclaimer, the term of this patent is extended or adjusted under 35 U.S.C. 154(b) by 0 days.

(21) Appl. No.: 15/390,443

(22) Filed: Dec. 23, 2016

(65) Prior Publication Data
US 2018/0033172 A1 Feb. 1, 2018

(30) Foreign Application Priority Data
Jul. 26, 2016 (CN) .......................... 2016 1 0596956

(51) Int. Cl.
*G06T 11/60* (2006.01)
*H04N 5/44* (2011.01)
*H04N 5/265* (2006.01)

(52) U.S. Cl.
CPC ............. *G06T 11/60* (2013.01); *H04N 5/265* (2013.01); *H04N 5/44* (2013.01)

(58) Field of Classification Search
CPC .......................... H04N 13/007; H04N 5/4448
USPC ..................... 348/559–560, 563–56
See application file for complete search history.

(56) References Cited

U.S. PATENT DOCUMENTS

| | | | | |
|---|---|---|---|---|
| 6,195,118 B1 * | 2/2001 | Nakano | ............. | H04N 1/00098 348/24 |
| 7,269,801 B2 * | 9/2007 | Kyle | ................ | G08G 1/096811 715/771 |
| 7,930,072 B2 * | 4/2011 | Kyle | ................ | G08G 1/096811 701/1 |
| 2005/0002649 A1 * | 1/2005 | Boyle | ................ | H04N 5/44543 386/297 |
| 2005/0122863 A1 * | 6/2005 | Kudo | .................. | H04N 9/7921 369/47.23 |
| 2005/0219268 A1 * | 10/2005 | Kyle | .................... | G08G 1/0969 345/660 |
| 2007/0294642 A1 * | 12/2007 | Kyle | ................ | G08G 1/096811 715/855 |
| 2008/0119235 A1 * | 5/2008 | Nielsen | ................ | G06F 3/0483 455/566 |

(Continued)

*Primary Examiner* — Paulos M Natnael
(74) *Attorney, Agent, or Firm* — J.C. Patents (57) ABSTRACT

This application provides a TV screenshot method and an associated television (TV). The method includes: upon receiving a screenshot request, acquiring a layer range of On Screen Display (OSD) sub-layers corresponding to windows of every application displayed on an OSD layer; and generating the screenshot image by taking a snap shot of the OSD sub-layers in the layer range. This application can prevent unwanted system notification information image from being captured when a snap shot is taken.

15 Claims, 8 Drawing Sheets

(56) References Cited

U.S. PATENT DOCUMENTS

| | | | |
|---|---|---|---|
| 2008/0154764 A1* | 6/2008 | Levine | G06Q 40/04 705/37 |
| 2008/0312954 A1* | 12/2008 | Ullrich | G06F 19/363 705/2 |
| 2009/0282369 A1* | 11/2009 | Jones | G06F 17/30554 715/848 |
| 2011/0145070 A1* | 6/2011 | Wolinsky | G06Q 30/02 705/14.61 |
| 2011/0227911 A1* | 9/2011 | Joo | H04N 13/004 345/419 |
| 2012/0159356 A1* | 6/2012 | Steelberg | G06F 17/30861 715/760 |
| 2013/0169866 A1* | 7/2013 | Kim | H04N 21/4104 348/468 |
| 2013/0182072 A1* | 7/2013 | Seo | H04N 13/004 348/43 |
| 2013/0271448 A1* | 10/2013 | Lazarski | H04N 13/004 345/419 |
| 2015/0172766 A1* | 6/2015 | Shin | H04N 21/472 725/38 |
| 2015/0193906 A1* | 7/2015 | Zheng | G09G 5/14 345/522 |
| 2015/0220975 A1* | 8/2015 | Rychak | G06Q 30/0201 705/14.26 |
| 2016/0048290 A1* | 2/2016 | Zhang | G06F 3/044 345/168 |

* cited by examiner

METHOD FOR GENERATING SCREENSHOT IMAGE ON TELEVISION TERMINAL AND ASSOCIATED TELEVISION

CROSS-REFERENCE TO RELATED APPLICATIONS

This application claims priority to Chinese Patent Application No. 201610596956.1, filed on Jul. 26, 2016, entitled "METHOD FOR GENERATING SCREENSHOT IMAGE ON TELEVISION TERMINAL AND ASSOCIATED TELEVISION", which is hereby incorporated by reference in its entirety.

TECHNICAL FIELD

This application relates to the field of smart television (TV) technology, and particularly to a method for generating a screenshot image on a TV terminal and an associated TV.

BACKGROUND

With the development and popularization of smart TV systems, smart TVs not only can be used to watch live TV programs input by analog signals, digital signals, and etc., but also can be used to install some applications to achieve richer functions, even communicate with the Internet. In view of the above needs, a smart TV has various functions, including concurrently displaying pictures input by various physical signals, as well as interfaces for various applications.

When a user desires to record information while using the applications on the smart TV, relevant information can be stored in a screenshot manner. When the user initiates a screenshot operation, the existing TV screenshot method is to take a full screen snap shot on all the information presented on the TV. The full screen snap shot thus obtained may include unwanted system notification information, e.g. a volume bar, leading to excessive contents on the screenshot.

SUMMARY

This application provides a method for generating a screenshot image on a TV terminal and an associated television.

On a first aspect, this application provides a method for generating a screenshot image on a TV terminal, the method including:

upon receiving a screenshot request, acquiring a layer range of On Screen Display (OSD) sub-layers corresponding to windows of every application displayed on an OSD layer; and generating the screenshot image by taking a snap shot of the OSD sub-layers in the layer range.

On a second aspect, this application provides a television (TV), including:

a memory storing instructions; a processor coupled with the memory and configured to execute the instructions stored in the memory, and the processor is configured to:

upon receiving a screenshot request, acquire a layer range of On Screen Display (OSD) sub-layers corresponding to windows of every application displayed on an OSD layer; and generate the screenshot image by taking a snap shot of the OSD sub-layers in the layer range.

BRIEF DESCRIPTION OF DRAWINGS

A brief introduction will be given hereinafter to the accompany drawings which will be used in the description of the embodiments or the prior art in order to explain the technical resolutions in the embodiments of the present application or the prior art more clearly. Apparently, the drawings described below are merely some embodiments of the present application. Those skilled in the art may derive other drawings from these drawings without any creative effort.

DETAILED DESCRIPTION

In order to make the purposes, the technical solutions and the advantages of the present application more apparent, the technical solutions of the present application will be described clearly and completely with reference to the accompanying drawings. Obviously, the described embodiments are only part of the embodiments of the present application, rather than all of them. According to the embodiments of the present application, all of the other embodiments obtained by those with ordinary skill in the art without any creative effort fall within the protection scope of the present application.

Figure 1:
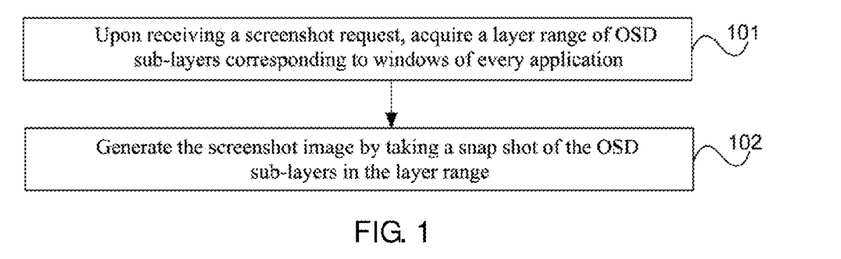
FIG. 1 is a flowchart illustrating a method for generating a screenshot image on a TV terminal provided in some embodiments of this application.

FIG. 1 is a flowchart illustrating a method for generating a screenshot image on a TV terminal provided in some embodiments of this application.

Step 101: upon receiving a screenshot request, acquire a layer range of On Screen Display (OSD) sub-layers corresponding to windows of every application.

Step 102: generate the screenshot image by taking a snap shot of the OSD sub-layers in the layer range.

In this application, when a user desires to keep image information currently displayed on the TV terminal, the user may initiate a screenshot request through the remote or voice control of the TV terminal, which will not be limited in this application. When the screenshot request is received, the TV terminal may decide on the screen content to be captured. It should be noted that, the image displayed on the TV terminal may include: signal input from various physical signal sources, application windows, and system notifications, etc. Among these, the signal input from the physical signal source is presented on the signal layer, while applications running on the TV terminal, as well as the system notifications, are presented on the OSD layer. Each application may put up one or more windows on the TV screen, with each window being on different OSD sub-layers in the OSD layer, where an OSD sub-layer may be identified by a windows layer.

The TV terminal may interpret the user's intention for the snap shot based on the images currently displayed. For instance, if only an application window is displayed on the current screen, the screenshot may be performed for the OSD sub-layer containing the application window alone. When an application and a system notification are shown on the current screen, snap shots may be separately taken for the OSD sub-layer containing the application window and that containing the notification, or just for that containing the application window alone. If an application window and signals on the signal layer are concurrently displayed, snap shots may be separately taken for the OSD sub-layer containing the application window and the signal layer, and the final screenshot image may be obtained by superposing the separately captured OSD sub-layers containing the application windows and the signal layer.

There may be at least two active applications in the layer range to be acquired, with each application presenting one or more windows on the OSD layer. Thus, when the current screen displays multiple windows of one or more applications, a layer range, which includes the OSD sub-layers corresponding to the multiple windows, may be acquired. For example, a layer range of the OSD sub-layers corresponding to the windows of a particular application displayed on the current screen may consists of a collection of OSD sub-layers corresponding to the one or more windows of that application. Similarly, a layer range of the OSD sub-layers corresponding to multiple windows of multiple applications displayed on the current screen may consists of a collection of OSD sub-layers corresponding to the multiple windows of the multiple applications.

The TV terminal may generate the screenshot image by superposing every OSD sub-layer in the layer range thus acquired and taking a snap shot of the superposed image at a time, thus generating the final screenshot image without having to separately take snap shots of every OSD sub-layer and determine which image should be in the front or which part of an image should be covered.

Upon receiving the screenshot request, a layer range of OSD sub-layers corresponding to windows of every application displayed on the OSD layer are acquired, and the screenshot image are generated by taking a snap shot of the OSD sub-layers in the layer range. Since the scope of the screenshot does not include the OSD sub-layers containing system notifications, unwanted system notifications can be prevented from showing up in the final snap shot obtained when a full screen snap shot of the entire OSD layer is taken.

It should also be noted that, the TV terminal may pre-define layer attributes of an OSD sub-layer. For instance, the OSD sub-layer is an opaque layer if the window displaying area on this OSD sub-layer covers the entire screen, or the OSD sub-layer is a semitransparent layer if the window displaying area on this OSD sub-layer does not spread over the entire screen. On the basis of the above described embodiment, this application further provides several optional implementations for taking a snap shot of the OSD sub-layers in the layer range.

Figure 2:
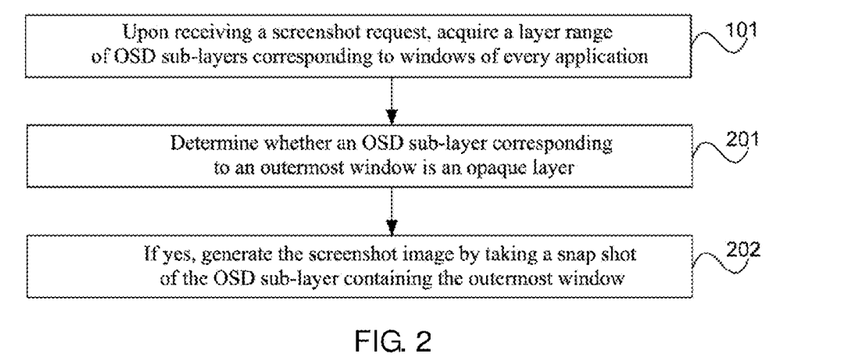
FIG. 2 is a flowchart illustrating another method for generating a screenshot image on a TV terminal provided in some embodiments of this application.

FIG. 2 is a flowchart illustrating a method for generating a screenshot image on a TV terminal provided in some embodiments of this application.

On the basis of the method illustrated in FIG. 1 and referring to FIG. 2, the step 102 may include:

Step 201: determine whether an OSD sub-layer corresponding to an outermost window is an opaque layer.

In this case, the outermost window is the window in the layer range displayed at the outermost side of the TV terminal.

Step 202: if yes, generate the screenshot image by taking a snap shot of the OSD sub-layer containing the outermost window.

Since the OSD sub-layer closest to the user is an opaque layer, i.e. the window displaying area on this OSD sub-layer covers the entire screen, the snap shot may only include the OSD sub-layer containing this window, without the need to capture any OSD sub-layer of the windows in the back thereof.

Figure 3:
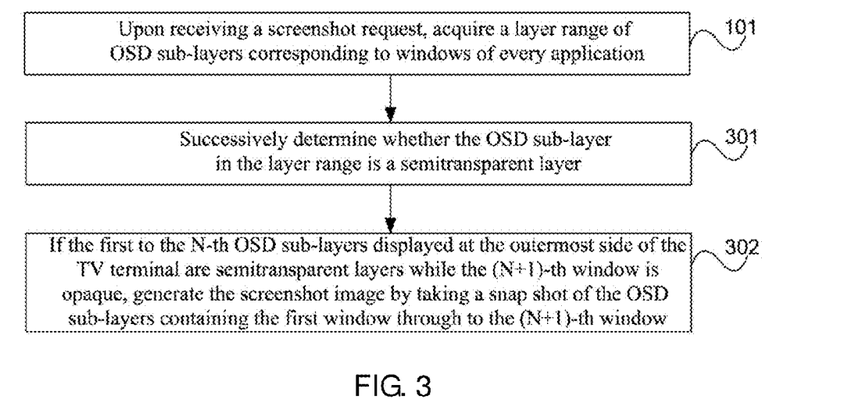
FIG. 3 is a flowchart illustrating yet another method for generating a screenshot image on a TV terminal provided in some embodiments of this application.
Figure 4:
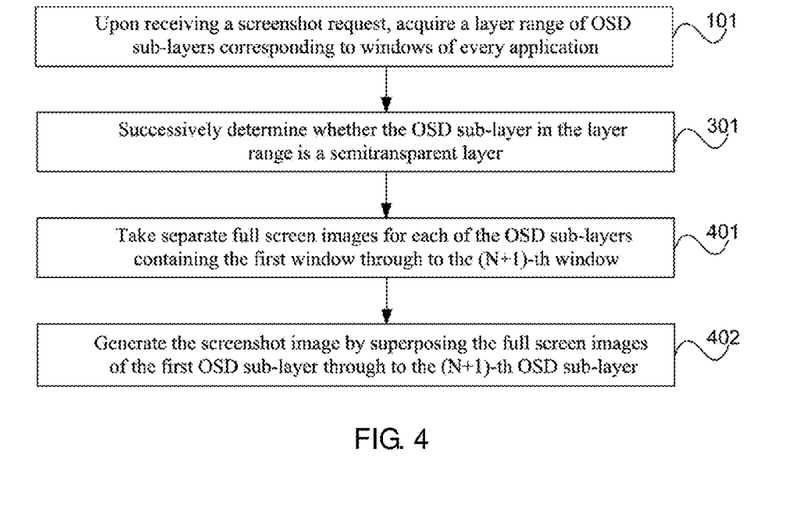
FIG. 4 is a flowchart illustrating an optional implementation for the step 302 in the method depicted in FIG. 3.
Figure 5:
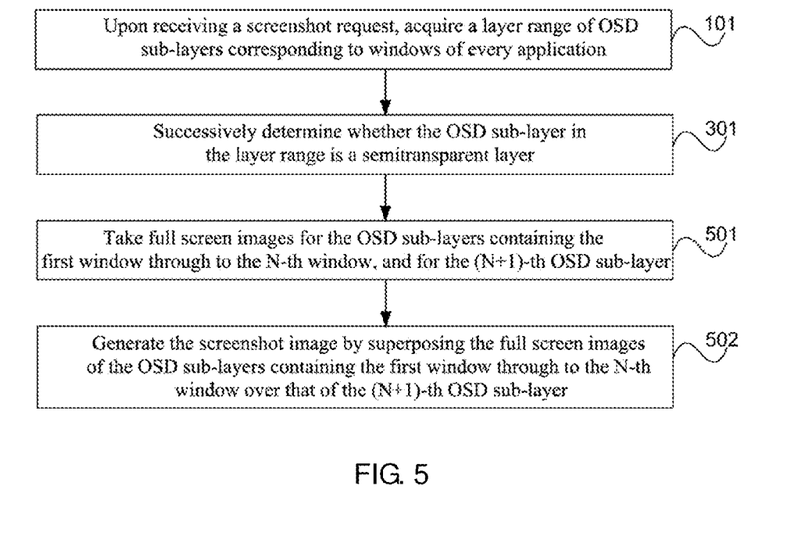
FIG. 5 is a flowchart illustrating another optional implementation for the step 302 in the method depicted in FIG. 3.

FIG. 3 is a flowchart illustrating a method for generating a screenshot image on a TV terminal provided in some embodiments of this application. FIG. 4 is a flowchart illustrating an optional implementation for the step 302 in the method depicted in FIG. 3. FIG. 5 is a flowchart illustrating another optional implementation for the step 302 in the method depicted in FIG. 3.

On the basis of the method illustrated in FIG. 1 and referring to FIG. 3, the step 102 may include:

Step 301: successively determine whether the OSD sub-layer in the layer range is a semitransparent layer.

For example, the determinations may be made successively, from the outside to the inside of the OSD sub-layer displayed on the TV terminal. The layer attributes of each OSD sub-layer may be determined in other sequences, or the layer attributes of all the OSD sub-layers may be determined at a time, which will not be limited in this application.

Step 302: if the first OSD sub-layer through to the N-th OSD sub-layer displayed at the outermost side of the TV terminal are semitransparent layers while the (N+1)-th window is an opaque layer, generate the screenshot image by taking a snap shot of the OSD sub-layers containing the first window through to the (N+1)-th window, where $N \geq 1$.

It should be noted that, the generating the screenshot image by taking a snap shot of the OSD sub-layers containing the first window through to the (N+1)-th window in the step 302 may further include several optional implementations.

In a first implementation of step 302, and referring to FIG. 4, the step 302 may include:

Step 401: take separate full screen images for each of the OSD sub-layers containing the first window through to the (N+1)-th window.

In such a full screen image of the OSD sub-layer, areas other than the window displayed on the OSD sub-layer is filled with a background color, e.g. black, if the OSD sub-layer is a semitransparent layer, i.e. the window displayed on the OSD sub-layer does not cover the entire screen.

Step 402: generate the screenshot image by superposing the full screen images of the first OSD sub-layer through to the (N+1)-th OSD sub-layer.

In this case, the superposing process may begin from removing the background color from the full screen images of the first OSD sub-layer through to the N-th OSD sub-layer, then proceed to follow the order these OSD sub-layers are arranged to superpose these full screen images over that of the (N+1)-th OSD sub-layer, thus generating the screenshot image.

The background color may be removed by directly removing image portions in black, or removing image portions other than the window displaying areas on the full screen image, which will not be limited in this application.

In a second implementation of step 302, referring to FIG. 5, and the step 302 may include:

Step 501: take full screen images for the OSD sub-layers containing the first window through to the N-th window, and take a full screen image for the (N+1)-th OSD sub-layer.

In this case, areas not covered by the first window through to the N-th window when the full screen image is taken may be filled with a background color in a way similar to that of step 401, which will not be repeated herein.

Step 502: generate the screenshot image by superposing the full screen images of the OSD sub-layers containing the first window through to the N-th window over the full screen image of the (N+1)-th OSD sub-layer.

In this case, the screenshot image is generated by removing the background from the full screen images of the OSD sub-layers containing the first window through to the N-th window, and then superposing these full screen images over the full screen image captured for the (N+1)-th OSD sub-layer.

The background is removed from the full screen image being generated according to screen areas not covered by the windows in a way similar to that of step 402, which will not be repeated herein.

Since the first through to the N-th OSD sub-layers closest to the user are semitransparent layers, while the (N+1)-th OSD sub-layer is an opaque layer, i.e. the window displaying area on this (N+1)-th OSD sub-layer covers the entire screen, the snap shot may only include the OSD sub-layer containing the first N+1 windows, without having to capture any OSD sub-layer ranked after N+1.

Figure 6:
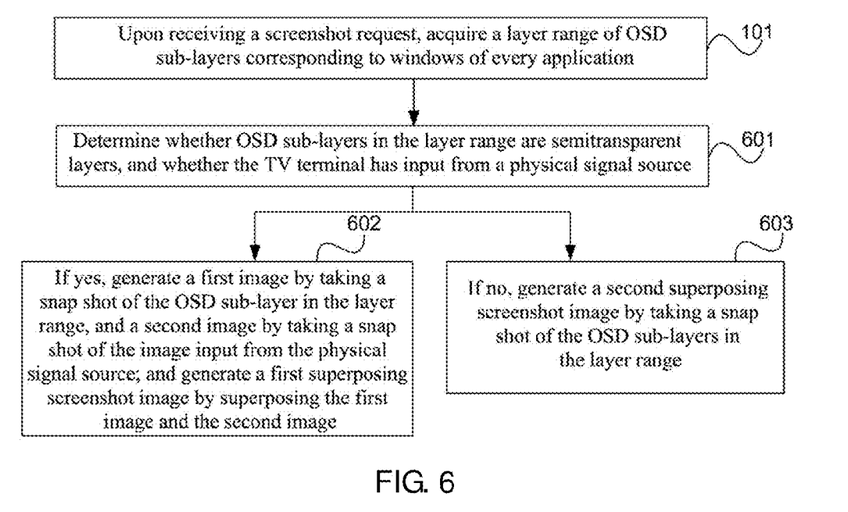
FIG. 6 is a flowchart illustrating yet another method for generating a screenshot image on a TV terminal provided in some embodiments of this application.
Figure 7A:
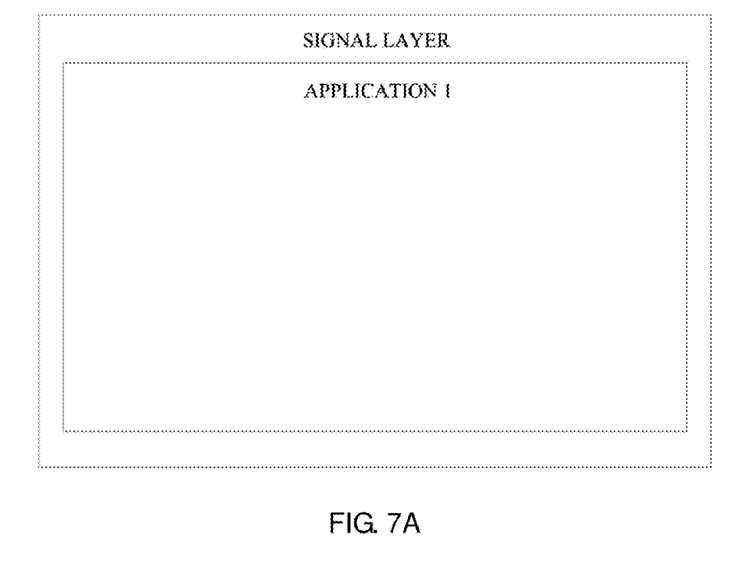
FIG. 7A is a schematic diagram of an interface according to an application scenario for the method depicted in FIG. 6.
Figure 7B:
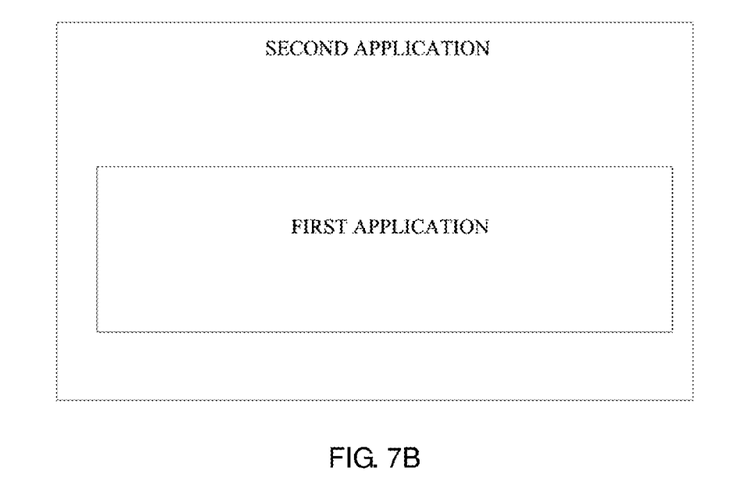
FIG. 7B is a schematic diagram of an interface according to another application scenario for the method depicted in FIG. 6.

FIG. 6 is a flowchart illustrating a method for generating a screenshot image on a TV terminal provided in some embodiments of this application. FIG. 7A is a schematic diagram of an interface according to an application scenario for the method depicted in FIG. 6. FIG. 7B is a schematic diagram of an interface according to another application scenario for the method depicted in FIG. 6. Referring to FIG. 6, on the basis of the method illustrated in FIG. 1, the step 102 in this method embodiment may include:

Step 601: determine whether OSD sub-layers in the layer range are semitransparent layers, and whether there is input at a physical signal source of the TV terminal.

Step 602: if the result is yes, generate a first image by taking a snap shot of the OSD sub-layer in the layer range, and a second image by taking a snap shot of the image input from the physical signal source; and generate a first superposing screenshot image by superposing the first image and the second image.

In this case, the first image may be generated by taking a snap shot of the OSD sub-layers in the layer range in a way similar to that described in step 401 or 501 for taking the full screen image of the first OSD sub-layer through to the N-th OSD sub-layer.

The generating the second image by taking a snap shot of the image input from the physical signal source may include:

acquiring the image presented on the signal layer from the physical signal source; and obtaining a second image by taking a snap shot of the image displayed on the signal layer.

It should be noted that, the generating a screenshot image by superposing the first image and the second image in step 602 may be accomplished in a way according to the superposing the full screen images of the first through to the N-th OSD sub-layers over that of the (N+1)-th OSD sub-layer described in step 402 or 502.

Optionally, following step 601, it may further include:

Step 603: if the result is no, generate a second superposing screenshot image by taking a snap shot of the OSD sub-layers in the layer range.

It should be noted that, if the result is no, i.e. not all OSD sub-layers in the layer range are semitransparent layers, or no image input is detected at a physical signal source of the TV terminal, then there is no need to take the snap shot of the image input from the physical signal source. Furthermore, the snap shot may be taken for the OSD sub-layers in the layer range by following the process in steps 301 and 302 when not all the OSD sub-layers in the layer range are semitransparent layers.

The existing TV screenshot method only supports capturing a full screen of the entire signal layer or the OSD layer, and hence windows for system notification information, e.g. volume bar, will also be captured in the final screenshot image if a full screen snap shot is captured for the current TV display when physical signal source input, other application windows and system notification information are all presented on the TV. However, in practical use, it is unnecessary to take a snap shot of these system notification information interfaces. Hence, when screenshot is taken, it is necessary to remove system notification information windows interfaces on the OSD layer.

It should be noted that, the OSD may include one level of Activity for applications and multiple levels of FloatView for displaying system notification information, where application windows are typically displayed on the Activity. According to the method provided in this application, it is possible to obtain snap shot images corresponding to sub-layers in the Activity, i.e. snap shot images for OSD sub-layers containing application windows.

In order to solve the aforementioned problems in embodiments of this application, a user may initiate a screenshot request to the TV terminal by making a key stroke on a remote controller or through voice when a snap shot of the TV is desired. Upon receiving the screenshot request, after determining that all OSD sub-layers on the OSD layer are semitransparent layers, the TV terminal determines whether the TV terminal has input from a physical signal source such as a Digital TV (DTV)/Analog TV (ATV) signal, High Definition Multimedia Interface (HDMI)/Audio-Video (AV)/Video Graphics Array (VGA), etc., the input content from which are displayed on the signal layer of the TV.

If there is input from a physical signal source, a display image is acquired from the physical signal source by implementing any method for taking a snap shot of the signal layer in the related art. Meanwhile, a layer range is acquired for the OSD sub-layers corresponding to windows of at least one application displayed on the OSD layer. For example, a TV terminal screen is displaying a physical signal source input and an application window, with a system notification information window interface floating over the display pictures of the current application and physical signal source input. At this time, snap shots need to be separately taken for the OSD sub-layers corresponding to the system notification information and the display pictures of the current application and physical signal source input. For instance, a window of Application 1 is on OSD sub-layers spanning the layer range of 21050-21055, and is displayed atop the signal layer. Optionally, there may further be a system notification information window interface on OSD sub-layers spanning the layer range of 21060-21065. Then, as depicted in FIG. 7A, a first superposing interface snap shot is ultimately acquired by combining a snap shot of the display image of the physical signal source with the interface snap shot of OSD sub-layers in the layer range of 21050-21055 that corresponds to the window of Application 1.

If there is no physical signal source input, as depicted in FIG. 7B, if multiple application windows are displayed on the TV, a layer range will be acquired for the OSD sub-layers corresponding to the multiple application windows. According to these sub-layers, a snap shot is separately taken for each application interface. Finally, the snap shots for every application interface in the layer range are combined to obtain the second superposing interface snap shot. For example, in FIG. 7B, windows of the second application correspond to a window layer range of 21050-21055, and windows of the first application correspond to a window layer range of 21056-21056. If the windows of the first application, which are show on the top, are on semitransparent OSD sub-layers, and windows of the second application are also on semitransparent OSD sub-layers in the range of 21051-21055, snap shots will be taken for OSD sub-layers in the range of 21050-21056, so as to obtain the screenshot image.

In this case, when the layer range corresponding to application windows is acquired in practical applications, the layer range corresponding to a window may be acquired via an interface from the window management framework service of the operation system. In the present application, a new Read command and a layer range acquiring logic are added to the inter-process communication interface of said service, which are related to communications between the processes for OSD layer handling and signal layer handling, and can leverage communication mechanisms between binder processes to realize data transfer.

The method for generating a screenshot image on a TV terminal provided in this embodiments acquires, upon receiving a screenshot request, a layer range for OSD sub-layers corresponding to windows of every application displayed on an OSD layer, determines whether OSD sub-layers in the layer range are semitransparent layer, and whether an input is detected at a physical signal source of the TV terminal. If the result is yes, a snap shot will be captured for the display image of the physical signal source on the signal layer and for the OSD sub-layers corresponding to the windows of every application according to the layer range. Then, the screenshot image may be obtained by superposing the snap shot of OSD sub-layers containing the application windows over the snap shot of the display image of the physical signal source on the signal layer. Since the snap shot is only taken for the applications displayed on the OSD layer and the display image of the physical signal source on the signal layer, unwanted system notification information window interface will not be included in the final snap shot.

In this case, a specialized data structure may be constructed to store each data set, so as to facilitate the acquisition of layer range data of the application windows, and hence the step 101 may further include:

store the layer range of application windows using an array.

An array may be used for storing layer range data of a set of windows, where each element in the array may indicate a layer of a window or a layer range of a set of windows, such as a layer range of every window of an application. The data may be written into the array in an order representing the sequence of how the layers are superposed, i.e. layer or layer range data for OSD sub-layers of application window displayed on the top layer are stored in the front of the array, and so on. The number of data in the array indicates the number of applications for which snap shots need to be taken.

Such a data structure may for example be:
WindowLayer {
String packageName;—Package name of the application
int maxLayer;—Maximum window layer
int minLayer;—Minimum window layer
}

Furthermore, on the basis of the above described embodiment, as depicted in FIG. 7B, if multiple applications are displayed on the TV screen, this embodiment may take separate snap shots for each of the multiple interfaces of the multiple applications. If a first application is displayed over, but does not completely cover, a second application, separate snap shots may be taken for the first and the second applications. Alternatively, a snap shot may be taken after superposing the interfaces, which may be realized in a way described in the following:

acquiring a layer range [M, N] of the superposed windows, where M is the minimum layer of the layer range of the windows of the second application, and N is the maximum layer of the layer range of the windows of the first application; and acquiring a first superposing interface snap shot by taking a snap shot for interfaces in the window layer range of [M, N], where the first superposing interface snap shot is a snap shot of the superposed interfaces of the first and the second applications depicted in FIG. 7B.

For example, if the windows of the second application are in the layer range of 21050-21055 and the windows of the first application are in the layer range of 21056-21056, snap shot will need to be captured for the windows in the range of [21050, 21056], i.e. the [M, N]. As an example, when stored as array elements, the layer range of the windows of the first application may be {1; 21056; 21056}, while that of the second application may be {2; 21050; 21055}.

In this case, the applications are displayed on the user interface (UI) layer, and a full screen image may be captured for each application window by taking snap shots of the UI layer according to the maxLayer value and the minLayer value in each set of data structure in the array, using the packageName in the set of data respectively as the identification (ID) for the snap shot, so that the ID may be used in the future for generating the superposed image.

In this case, if there are applications which are not displayed over the entire screen, a snap shot captured for such an application will have a black background that, if simply combined with the snap shot of the display image, could undesirably cover the display image on the signal layer. Hence in step 102, the full screen images for each application, after being separately captured, may be processed to have their background removed in a way similar to that of step 402 before the images are superposed to generate the final screenshot image. For example, interface snap shots of applications that are not displayed over the entire screen may be processed to have their black background removed.

The black background may be removed by: drawing the entire application interface, except for the black background, onto a transparent canvas dimensioned identically as the interface of the original application.

Figure 8A:
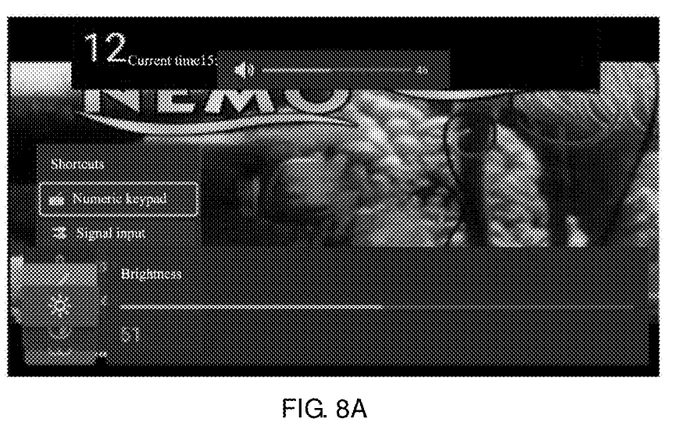
FIG. 8A is a schematic diagram of an application scenario according to some embodiments of this application.
Figure 8B:
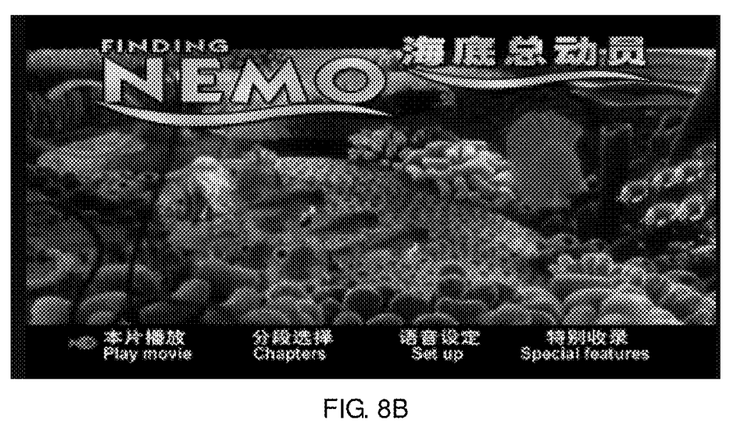
FIG. 8B is a schematic diagram of a display image on a signal layer according to some embodiments of this application.
Figure 8C:
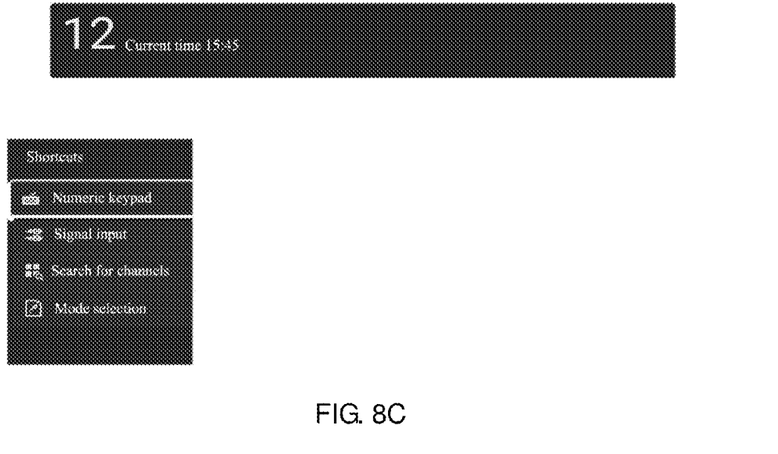
FIG. 8C is a schematic diagram of a picture of a live TV application on an OSD layer according to some embodiments of this application.
Figure 8D:
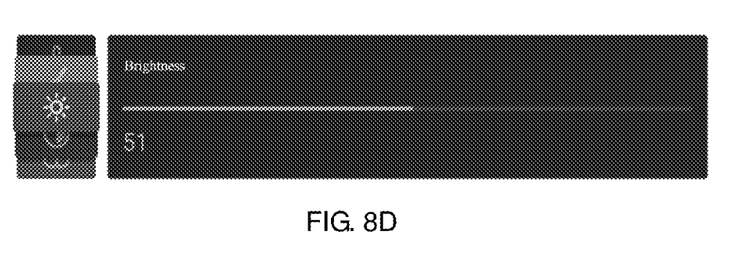
FIG. 8D is a schematic diagram of a picture of a setting application according to some embodiments of this application.
Figure 8E:
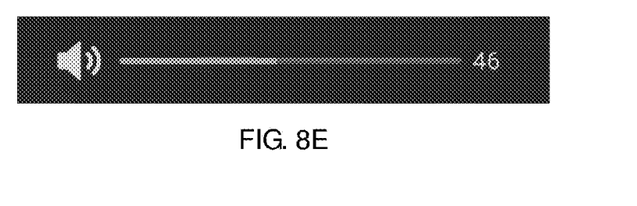
FIG. 8E is a schematic diagram of a picture of a volume bar on an OSD layer according to some embodiments of this application.
Figure 8F:
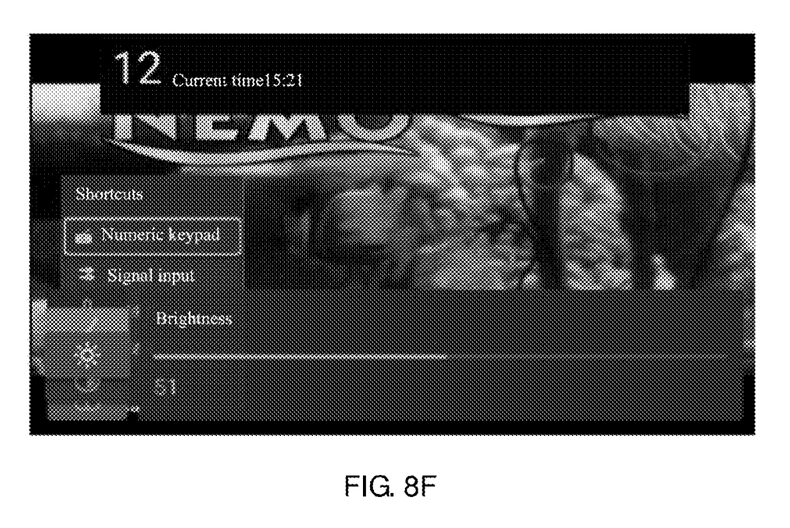
FIG. 8F is a schematic diagram of a picture showing a first superposing screenshot image captured in some embodiments of this application.

FIG. 8A is a schematic diagram of an application scenario according to some embodiments of this application. FIG. 8B is a schematic diagram of a display image on a signal layer according to some embodiments of this application. FIG. 8C is a schematic diagram of a picture of a live TV application on an OSD layer according to some embodiments of this application. FIG. 8D is a schematic diagram of a picture of a setting application on an OSD layer according to some embodiments of this application. FIG. 8E is a schematic diagram of a picture of a volume bar on an OSD layer according to some embodiments of this application. FIG. 8F is a schematic diagram of a picture showing a first superposing screenshot image captured in some embodiments of this application.

Furthermore, the user has turned on a live TV application, meaning that there is an input from a physical signal source, with the display image of the physical signal source being depicted in FIG. 8B. Moreover, the live TV application itself also has display pictures on the OSD layer, as depicted in FIG. 8C. Meanwhile, a setting application is additionally started, as depicted in FIG. 8D. Other than these, a volume bar is also turned on, as depicted in FIG. 8E. Hence in the end, as depicted in FIG. 8F, the snap shot of the signal layer and the snap shot of the OSD layer without the volume bar are superposed into a combined single image to obtain the final screenshot image, i.e. the first superposing screenshot image.

In an embodiment of this application, the obtained screenshot image may further be stored.

The method for generating a screenshot image on a TV terminal provided in various embodiments of this application may have a variety of implementations. For example, the screenshot request may be triggered by means other than the key stroke or voice of the user. For instance, the screenshot operation may be triggered when the user toggles, opens or closes an application, offering convenience to the user in viewing recently used applications and recent operations of the applications. That is, a screenshot request may be generated and received by the TV terminal, so that the TV terminal may produce a screenshot image, which includes no system notification information window interface, for an application by leveraging any of the screenshot image generating methods depicted in any one of the foregoing FIG. 1 to FIG. 8D. The screenshot images thus produced may be shown to the user when the user desires to view recently used applications and recent operations. Optionally, a screenshot operation may also be triggered while using a practical product by pressing and holding the Home key to trigger an operation for viewing recently used programs. The latest screenshot image may thus be generated and presented to the user by performing the steps of the foregoing screenshot image generating methods. At the same time, historically generated application screenshot images may be, e.g. lined up, and presented to the user.

Figure 9:
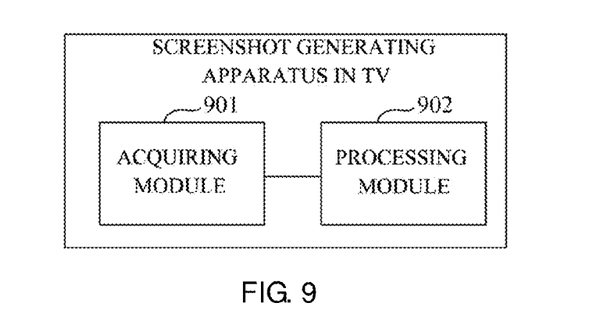
FIG. 9 is a schematic structural diagram illustrating an apparatus for generating a screenshot image on a TV terminal provided in some embodiments of this application.

FIG. 9 is a schematic structural diagram illustrating an apparatus for generating a screenshot image on a TV terminal provided in an embodiment of this application. As depicted in FIG. 9, an apparatus for generating a screenshot image on a TV terminal provided includes:

an acquiring module, configured to acquire a layer range of On Screen Display (OSD) sub-layers corresponding to windows of every application displayed on an OSD layer upon receiving a screenshot request; and a processing module, configured to generate the screenshot image by taking a snap shot of the OSD sub-layers in the layer range.

It should be noted that, the processing module may be configured to:

generate the screenshot image by taking a snap shot of the superposing OSD sub-layers in the layer range. Or, the processor may be configured to take separate full screen images for each of the OSD sub-layers, and generate the final screenshot image according to the sequence in which each window displayed on each OSD sub-layer are ranked and superposed. For the implementation, reference may be made to FIG. 1 to FIG. 8D.

It should be noted that, the apparatus can perform any of the TV screenshot methods depicted in FIG. 1 to FIG. 8D, and may include, but not limited to, implementations of the following structures.

The processing module may be configured to:

determine whether OSD sub-layers in the layer range are semitransparent layers, and whether there is an image input at a physical signal source of the TV terminal; if yes, generate a first image by taking a snap shot of the OSD sub-layers in the layer range, and a second image by taking a snap shot of the image input from the physical signal source; and generate the screenshot image by superposing the first image and the second image.

In this case, the first image may further be processed by removing a background thereof, and the background-removed first image may be superposed over the second image.

In another optional implementation, the processing module may further be configured to:

determine whether an OSD sub-layer corresponding to an outermost window is an opaque layer, wherein the outermost window is the window in the layer range displayed at the outermost side of the TV terminal; and if the OSD sub-layer corresponding to the outermost window is an opaque layer, generate the screenshot image by taking a snap shot of the OSD sub-layer containing the outermost window.

In yet another optional implementation, the processing module may be configured to:

successively determine whether the OSD sub-layer in the layer range is a semitransparent layer; and if the first OSD sub-layer through to the N-th OSD sub-layer displayed at the outermost side of the TV terminal are semitransparent layers while the (N+1)-th OSD sub-layer is an opaque layer, generate the screenshot image by taking a snap shot of the OSD sub-layers containing the first window through to the (N+1)-th window, where N≥1.

It should be additionally noted that, the processing module may be configured to:

separately determine each OSD sub-layer occupied by a window of each active application; and determine the layer range of the OSD sub-layers corresponding to the windows of every application based on a collection of OSD sub-layers occupied by the window of the active applications.

An apparatus may be arranged in a TV for performing the technical solution of the embodiment methods shown in FIG. 1 to FIG. 8D. The implementation principles and technical effects thereof are similar, and neither of which will be repeated herein.

Figure 10:
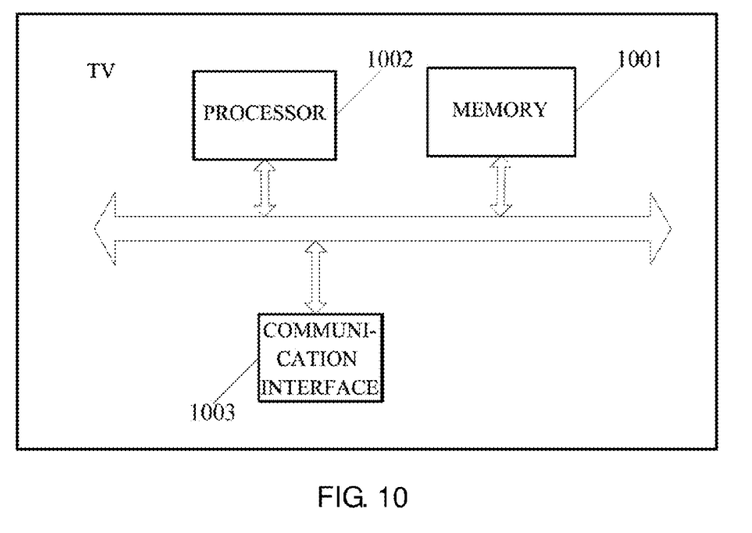
FIG. 10 is a schematic structural diagram illustrating a TV provided in some embodiments of the present application.

FIG. 10 is a schematic structural diagram illustrating a TV provided in an embodiment of the present application. As depicted FIG. 10, a TV may include: a memory 1001; a processor 1002; and a communication interface 1003, where the memory 1001 is configured to store programs which, may include programming codes that include computer operating instructions. The memory 1001 may include a random access memory (RAM), and may further include a non-volatile memory, such as at least one magnetic disk memory.

The processor 1002 is configured to execute the programs stored in the memory 1001 for carrying out the technical solution provided in embodiments of this application, the implementation principles and technical effects thereof are similar, which may be understood by referring to the method embodiment depicted in FIG. 1, and will not be repeated herein.

The communication interface 1003 is configured to receive the screenshot request.

Functionalities of the processing module and the acquiring module in the above described apparatus may be realized through a processor 1002.

Furthermore, the TV may further include a display screen.

The aforementioned components communicate via one or more buses. Those of ordinary skill in the art will appreciate that the structure for the TV depicted in FIG. 10 is not to limit on the present application. Rather, the structure may be in bus or star connection, may include more or less components than those shown. Some components may be recombined, or rearranged in alternative ways.

It should be noted that, since the TV embodiments substantially correspond to the method embodiments, similar parts of the method embodiments may be referred to the apparatus embodiments.

Persons of ordinary skill in the art may understand that, all or a part of steps of the foregoing method embodiments may be implemented by a program instructing relevant hardware. The program may be stored in a computer readable storage medium. When the program is executed, the steps of the foregoing embodiment methods are performed. The foregoing storage medium includes various mediums capable of storing program codes, such as a ROM (read only memory), a RAM (random access memory), a magnetic disk, or an optical disc.

Finally, it should be noted that the foregoing embodiments are merely intended to describe the technical solutions of the present application rather than to limit thereto. Although the present application is described in detail with reference to the foregoing embodiments, persons of ordinary skill in the art should understand that they may still make modifications to the technical solutions described in the foregoing embodiments, or make equivalent replacements to some or all technical features therein; however, these modifications or replacements do not make the essence of corresponding technical solutions depart from the scope of the technical solutions in the embodiments of the present application.

What is claimed is:

1. A method for generating a screenshot image on a television (TV) terminal, comprising:
   upon receiving a screenshot request, acquiring a first layer range of at least one On Screen Display (OSD) sub-layer corresponding to a window of an application displayed on an OSD layer; and
   generating the screenshot image by taking a snap shot of the at least one OSD sub-layer in the first layer range;
   wherein the generating the screenshot image by taking a snap shot of the at least one OSD sub-layer in the first layer range comprises:
   when the at least one OSD sub-layer in the first layer range comprises an opaque layer, generating the screenshot image by taking a snap shot of the opaque layer and other layers at the outer side of the opaque layer;
   when the at least one OSD sub-layer in the first layer range does not comprise an opaque layer and there is an image input at a physical signal source of the TV terminal, generating a first image by taking a snap shot of the at least one OSD sub-layer in the first layer range, and a second image by taking a snap shot of the image input from the physical signal source; and generating the screenshot image by superposing the first image and the second image; and
   when the at least one OSD sub-layer in the first layer range does not comprise an opaque layer and there is no image input at the physical signal source of the TV terminal, generating the screenshot image by taking a snap shot of the at least one OSD sub-layer in the first layer range.

2. The method according to claim 1, wherein the generating the screenshot image by superposing the first image and the second image comprises:
   processing the first image by removing a background thereof; and
   superposing the background-removed first image over the second image.

3. The method according to claim 1, wherein the acquiring a first layer range of at least one OSD sub-layer corresponding to a window of an application displayed on an OSD layer comprises:
   separately determining each OSD sub-layer occupied by each window of each active application; and
   determining the first layer range of the at least one OSD sub-layer corresponding to the window of the application based on a collection of determined OSD sub-layers occupied by windows of active applications.

4. The method according to claim 1, wherein the taking a snap shot of the at least one OSD sub-layer in the first layer range comprises:
   generating the screenshot image by taking a snap shot of an image formed by superposing OSD sub-layers in the first layer range.

5. The method according to claim 1, wherein the first layer range is a layer range of all OSD sub-layers corresponding to windows of all applications displayed on the OSD layer, and the second layer range is a layer range of all OSD sub-layers corresponding to all windows of system notification information displayed on the OSD layer;
   wherein the OSD sub-layers in the second layer range are not used for generating the screenshot image.

6. The method according to claim 1, wherein an OSD sub-layer corresponds one-to-one to a window, and one application has one or more windows.

7. The method according to claim 1, wherein the method further comprises acquiring a second layer range of at least one OSD sub-layer corresponding to a window of system notification information displayed on the OSD layer.

8. A television (TV), comprising: a memory storing instructions; a processor coupled with the memory and configured to execute the instructions stored in the memory, and the processor is configured to:

upon receiving a screenshot request, acquire a first layer range of at least one On Screen Display (OSD) sub-layer corresponding to a window of an application displayed on an OSD layer; and generate a screenshot image by taking a snap shot of the at least one OSD sub-layer in the first layer range; wherein the processor is configured to:

when the at least one OSD sub-layer in the first layer range comprises an opaque layer, generate the screenshot image by taking a snap shot of the opaque layer and other layers at the outer side of the opaque layer;

when the at least one OSD sub-layer in the first layer range does not comprise an opaque layer and there is an image input at a physical signal source of the TV terminal, generate a first image by taking a snap shot of the at least one OSD sub-layer in the first layer range, and a second image by taking a snap shot of the image input from the physical signal source; and generate the screenshot image by superposing the first image and the second image; and when the at least one OSD sub-layer in the first layer range does not comprise an opaque layer and there is no image input at the physical signal source of the TV terminal, generate the screenshot image by taking a snap shot of the at least one OSD sub-layer in the first layer range.

9. The TV according to claim 8, wherein the processor is configured to:

process the first image by removing a background thereof; and superpose the background-removed first image over the second image.

10. The TV according to claim 8, wherein the processor is configured to:

separately determine each OSD sub-layer occupied by each window of each active application; and determine the first layer range of the at least one OSD sub-layer corresponding to the window of the application based on a collection of determined OSD sub-layers occupied by windows of active applications.

11. The TV according to claim 8, wherein the processor is configured to:

generate the screenshot image by taking a snap shot of an image formed by superposing OSD sub-layers in the first layer range.

12. The TV according to claim 8, wherein the first layer range is a layer range of all OSD sub-layers corresponding to windows of all applications displayed on the OSD layer, and the second layer range is a layer range of all OSD sub-layers corresponding to all windows of system notification information displayed on the OSD layer;

wherein the OSD sub-layers in the second layer range are not used for generating the screenshot image.

13. The TV according to claim 8, wherein the processor is further configured to acquire a second layer range of at least one OSD sub-layer corresponding to a window of system notification information displayed on the OSD layer.

14. A non-volatile computer readable medium having an instruction set stored thereon which, when being executed, causes a machine to perform a method for generating a screenshot image on a television (TV) terminal, wherein the method comprises: upon receiving a screenshot request, acquiring a first layer range of at least one On Screen Display (OSD) sub-layer corresponding to a window of an application displayed on an OSD layer; and generating the screenshot image by taking a snap shot of the at least one OSD sub-layer in the first layer range; wherein the generating the screenshot image by taking a snap shot of the at least one OSD sub-layer in the first layer range comprises: when the at least one OSD sub-layer in the first layer range comprises an opaque layer, generating the screenshot image by taking a snap shot of the opaque layer and other layers at the outer side of the opaque layer; when the at least one OSD sub-layer in the first layer range does not comprise an opaque layer and there is an image input at a physical signal source of the TV terminal, generating a first image by taking a snap shot of the at least one OSD sub-layer in the first layer range, and a second image by taking a snap shot of the image input from the physical signal source; and generating the screenshot image by superposing the first image and the second image; and when the at least one OSD sub-layer in the first layer range does not comprise an opaque layer and there is no image input at the physical signal source of the TV terminal, generating the screenshot image by taking a snap shot of the at least one OSD sub-layer in the first layer range.

15. The method according to claim 14, wherein the method further comprises acquiring a second layer range of at least one OSD sub-layer corresponding to a window of system notification information displayed on the OSD layer.

* * * * *